United States Patent [19]
Vandervaart

[11] Patent Number: 5,263,892
[45] Date of Patent: Nov. 23, 1993

[54] HIGH EFFICIENCY HEAT EXCHANGER SYSTEM WITH GLYCOL AND REFRIGERANT LOOPS

[75] Inventor: Gerry Vandervaart, Niagara Falls, Canada

[73] Assignee: Kool-Fire Research & Development, Niagara Falls, Canada

[21] Appl. No.: 725,107

[22] Filed: Jul. 3, 1991

[51] Int. Cl.$^5$ .................. F25B 29/00; F25B 27/00
[52] U.S. Cl. .................... 165/29; 237/2 B; 62/238.6; 62/238.7
[58] Field of Search ............ 237/2 B; 165/29, 61, 165/63, 64, 909; 62/238.6, 238.7

[56] References Cited

U.S. PATENT DOCUMENTS

| | | | |
|---|---|---|---|
| 2,241,060 | 5/1941 | Gibson | 237/2 B |
| 3,623,549 | 11/1971 | Smith, Jr. | 165/909 |
| 4,167,965 | 9/1979 | Rogers | 237/2 B |
| 4,190,199 | 2/1980 | Cawley et al. | 237/2 B |
| 4,311,191 | 1/1982 | Vandervaart | 165/29 |
| 4,311,192 | 1/1982 | Vandervaart | 165/29 |
| 4,461,345 | 7/1984 | Vandervaart | 165/113 |
| 4,517,810 | 5/1985 | Foley et al. | 62/238.6 |
| 4,825,664 | 5/1989 | Vandervaart | 62/324.1 |
| 4,995,241 | 2/1991 | Vandervaart | 165/29 |
| 5,003,788 | 4/1991 | Fischer | 62/238.6 |
| 5,020,320 | 6/1991 | Talbert et al. | 62/238.7 |

FOREIGN PATENT DOCUMENTS

| | | | |
|---|---|---|---|
| 2256380 | 7/1975 | France | 237/2 B |
| 2502762 | 10/1982 | France | 62/325 |
| 0211396 | 7/1984 | German Democratic Rep. | 62/238.6 |
| 0164243 | 10/1982 | Japan | 62/238.7 |
| 0124138 | 7/1983 | Japan | 62/238.7 |
| 2142136 | 1/1985 | United Kingdom | 237/2 B |

Primary Examiner—John K. Ford
Attorney, Agent, or Firm—Diller, Ramik & Wight

[57] ABSTRACT

A condensing gas furnace/heat exchange system is provided which includes two subsystems. A first subsystem includes an outdoor coil, an indoor coil, a reversing valve and a compressor, and the heat exchange medium thereof is a liquid refrigerant, such as freon. This subsystem is operative in heating, heat-augmented heating and cooling modes of operation, and in the heat-augmenting mode of operation, gas burners provide additional BTU's to the system. The other system includes an outdoor coil, an indoor coil and a pump, but excludes a compressor or a reversing valve, and utilizes a heat-exchange medium such as water, ethylene glycol, glycol per se or a nonrefrigerant. The pump merely pumps the glycol through the system which absorbs heat/BTU's from the flames of the burner which are eventually transferred by the indoor coil to heat an associated dwelling or the like.

27 Claims, 2 Drawing Sheets

HIGH EFFICIENCY HEAT EXCHANGER SYSTEM WITH GLYCOL AND REFRIGERANT LOOPS

BACKGROUND OF THE INVENTION

This invention is related to an improved high efficiency heat exchanger of the type disclosed in U.S. Pat. Nos. 4,311,191 and 4,311,192; each issued on Jan. 19, 1982 in the name of Gerry Vandervaart. Other patents directed to high efficiency heat exchangers of Gerry Vandervaart include U.S. Pat. No. 4,461,345 issued on Jul. 24, 1984; U.S. Pat. No. 4,825,664 issued on May 2, 1989; and U.S. Pat. No. 4,995,241 issued on Feb. 26, 1991.

The heat exchangers disclosed in the latter patents all include conventional components, such as a compressor, indoor and outdoor coils, blowers associated with the coils, a reversing/ expansion valve, and appropriate tubing or conduits through which a heat exchanger medium/refrigerant (Freon) can flow in opposite directions during the air conditioning/cooling mode operation on the one hand and the heating/heat-augmenting mode of operation on the other. Traditionally, conventional heat exchangers reversed operation for cooling and heating modes, but in these patents there is additionally disclosed a heat-augmenting mode of operation in which a gas burner directs flames against the outdoor coil as liquid refrigerant flows therethrough. The liquid refrigerant (Freon) absorbs the heat/Btu's which increases its temperature resulting in a vapor phase exiting the outdoor coil which is subsequently transferred to the indoor coil and utilized with its associated blower to heat the interior of a building or the like.

Though these heat exchangers are extremely efficient, they offer only three modes of operation, and though this is a vast improvement over the prior art which heretofore lacked the heat-augmenting mode of operation, it is desirable to, if possible, increase the heat exchanger efficiency. One approach is that disclosed most recently in U.S. Pat. No. 4,995,241 which utilizes a secondary flue gas absorber coil positioned between the main outdoor coil and a gas burner. The flue gases from flames of the gas burner pass through the coils of the secondary flue gas absorber and any liquid in the latter continues to boil-off as it absorbs heat from the flue gases and this keeps the secondary flue gas absorber coils relatively cold. By the time the flue gases pass through, above and beyond the secondary flue gas absorber coil, they are quite cold and transform the heat-exchange medium within the secondary flue gas absorber coil into a hot vapor which increases the overall efficiency of the entire system, as compared to a heat exchanger absent the secondary flue gas absorber.

SUMMARY OF THE INVENTION

Though the latter heat exchanger utilizing a secondary flue gas absorber coil is extremely efficient, particularly as compared to a heat exchanger absent the secondary flue gas absorber, it would be extremely advantageous to further increase the efficiency, particularly in the absence of increased compressor size or outdoor main coil size.

The latter is accomplished by the present invention through the utilization of two different indoor coils. One of the indoor coils is part of a conventional refrigerant heat exchanger system which utilizes a closed loop circulation system for a heat-exchanged medium, such as Freon or the like refrigerant. An outdoor refrigerant coil is connected through its closed conduit system to a reversing valve, a compressor, and the indoor refrigerant coil, and this system operates just as described in the latter-identified patents in the air-to-air heating and cooling modes, and the heat-augmented heating mode utilizing as a heat source the flames of an associated gas burner.

Another of the indoor coils is associated with another outdoor coil and the burner, and this additional indoor coil is part of a closed circuit system which utilizes a heat-exchange medium such as water, ethylene glycol, glycol per se or a like nonrefrigerant and an associated pump, but in the absence of a reversing valve or compressor. The nonrefrigerant medium is pumped by the pump through the glycol outdoor coil where under selected conditions it is heated by the flames of the gas burner and is pumped to the indoor nonrefrigerant or glycol coil.

An electrical control system of the invention is selectively operative to control the heat exchange system for operating in the following manners/modes:

1. In a first mode of operation, the compressor is rendered inoperative and the pump and burner are rendered operative during which time flue gases from the flame are absorbed by the heat-exchange medium flowing through the outdoor nonrefrigerant coil which is subsequently pumped to the indoor coil and an associated indoor fan to heat a building or the like. In this mode of operation the refrigerant system is, obviously, inoperative and, therefore, the Btu output is totally independent of the refrigerant system and its compressor capacity. In a working embodiment of the invention a 24,000 Btu compressor can absorb a maximum of 28,000 Btu's of gas flame input. However, irrespective of the latter compressor size, the nonrefrigerant system could supply 50,000; 60,000; 70,000; 80,000; etc., Btu's without altering the compressor size of the refrigerant system thereby providing tremendous flexibility, both in the heating and cooling modes.

2. In a second mode of operation, both the compressor of the refrigerant system and the pump of the nonrefrigerant system and the burner are operative which results in 100% efficiency when operating in this combined fashion, as compared to operating at 85% efficiency when in the nonrefrigerant first mode of operation earlier described. In other words, when both the refrigerant and the nonrefrigerant systems are operating simultaneously the nonrefrigerant system outdoor coil absorbs approximately 85% of the flue gas Btu's generated by the gas flame and the other 15% of the remaining flue gas Btu's are absorbed by the refrigerant of the outdoor refrigerant coil. However, the 85% efficiency of the nonrefrigerant system is not a disadvantage, but quite to the contrary the same enables the otherwise possibly wasted 15% of the flue gases which would escape to ambient if the refrigerant system were inoperative to be utilized to defrost the outdoor refrigerant coil when required (a) in the absence of compressor operation and (b) without reversing operation to remove heat from indoors, as is conventional.

Moreover, the electrical system includes a temperature-responsive switching circuit which establishes a predetermined changeover temperature setting which when less than outdoor ambient temperature renders the pump, the compressor and the gas burner operative, whereas when the setting is greater than outdoor ambient temperature, the compressor is rendered inoperative and only the pump and the burner operates. Therefore, through this selectivity, one could selectively vary the cut-in temperature depending upon energy costs in the geographical areas of utilization by simply selecting the most efficient mode of operation and its temperature cut-in point.

3. In a third mode of operation, the pump and heating means (gas burner) are rendered inoperative to achieve air-to-air heat exchange. However, even in this case if the demand becomes greater than the heat which can be provided in this air-to-air mode of operation, the electrical control circuit includes a circuit which cuts-in the nonrefrigerant heat exchange portion of the overall heat exchanger.

The latter represents a heat exchanger which in actual testing is over 200% efficient at 17° F. when burning gas or similar fossil fuel and with both the compressor and the pump running to effect heat exchange through both the refrigerant and nonrefrigerant outdoor coils and the associated refrigerant and nonrefrigerant indoor coils. Thus, not only is maximum efficiency effected, but selectively of operation of the modes of operation just described can match the heat exchanger to the energy costs (fossil fuel/gas) of particular geographic areas to further enhance the efficiency of the heat exchanger.

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENT

Figure 1:
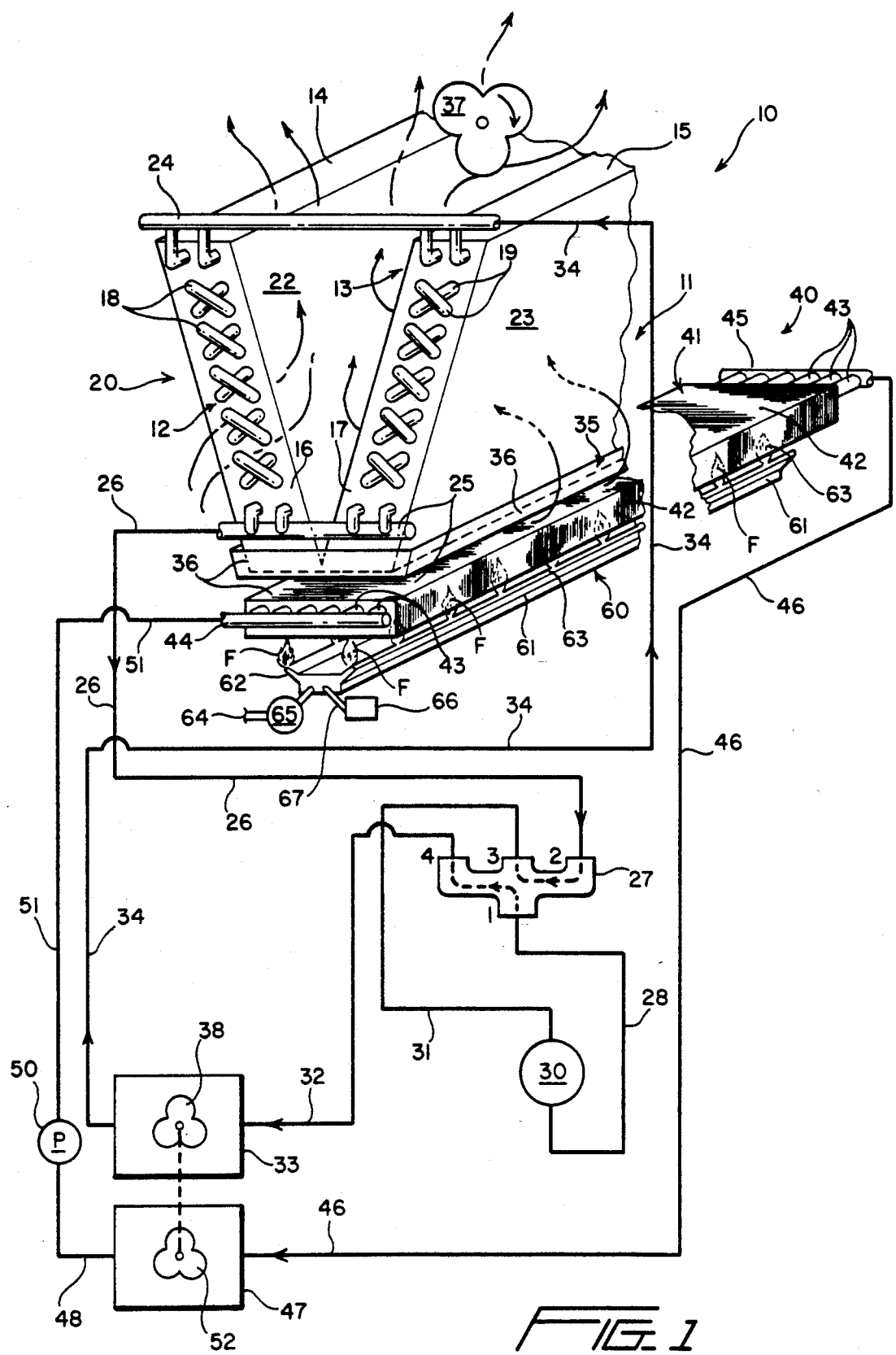
FIG. 1 is a schematic view of a novel heat-exchange system of the present invention, and illustrates indoor and outdoor refrigerant coils, indoor and outdoor nonrefrigerant coils, a closed conduit system associated with each, a pump in the nonrefrigerant conduit system, a reversing valve and pump/compressor in the refrigerant conduit system, a gas burner and associated fans.

A novel heat exchanger, heat-exchanger system or heat-exchanger combination constructed in accordance with this invention is illustrated in FIG. 1 of the drawings and is generally designated by the reference numeral 10.

The heat-exchanger 10 includes two cooperative heat-exchanger subsystems or heat exchangers 20 and 40.

The heat exchanger 20 of the heat-exchanger system 10 includes outdoor coil means 11 in the form of a generally V-coil of the type disclosed in the latter-identified patents, except, of course, being inverted. The V-coil 11 includes sides or legs 12, 13 having respective upper and lower ends or end portions 14, 15 and 16, 17, respectively. The sides or legs 12, 13 of the V-coils 11, 12 include continuous copper tubes or tubing 18, 19, respectively, which pass back and forth in a conventional manner through aluminum fins 22, 23, respectively. The tubing 18, 19 is connected to an upper manifold 24 and to a lower manifold 25. A first heat-exchange medium which is a refrigerant, such as Freon, is conducted from the manifold 24 downwardly through the tubing 18, 19 and outwardly into the lower manifold 25 in one mode of operation of the heat-exchanger system 10 while in a second mode of operation of the heat-exchanger system 10, the heat-exchanger medium flows from the lower manifold 25 upwardly through the tubing 18, 19 and exits into the upper manifold 24.

The heat exchanger 20 includes a continuous closed loop conduit or pipe system defined by a conduit 26 between the lower manifold 25 and the "2" port of conventional reversing valve means or a reversing valve 27, a conduit 28 between the "1" port of the reversing valve 27 and first pump means in the form of a compressor 30, another conduit 31 between the compressor 30 and the "3" port of the reversing valve 27, a conduit 32 between the "4" port of the reversing valve 27 and indoor coil means 33 associated with a building or the like, and a conduit 34 between the first indoor coil means or indoor coil 33 and the upper manifold 24.

The lower ends or end portions 16, 17 of the V-coil 11 are seated in a generally rectangular or polygonal drain pan or condensation tray 35 having a closed bottom (unnumbered) and a peripheral wall 36. A drain opening (not shown) is provided in the bottom wall (unillustrated) of the drain pan or convector tray 35 to allow condensate collected in the pan 36 to be conducted by a pipe (not shown) to a conventional sewer drain or the like.

First outdoor fan means or a fan 37 is associated with the V-coil 11, while first indoor fan means or a fan 38 is associated with the indoor coil 33. The fans 37, 38 are selectively rendered operative and/or inoperative in a manner to be described more fully hereinafter.

The heat-exchanger subsystem or heat exchanger 40 includes second outdoor coil means in the form of a generally flat rectangular coil 41 which includes a plurality of copper fins 42 and copper tubing 43 which, though not illustrated, runs back and forth through the length of the coil 41 with selective opposite ends thereof exiting in fluid communication with a forward manifold 44 and a rear manifold 45. The outdoor coil 41 has a heat-exchange medium circulated through the coils 43 and the manifolds 44, 45 thereof, much in the same manner as that of the heat exchanger 20. However, the heat-exchange medium of the heat exchanger 40 is not a refrigerant but instead is a nonrefrigerant heat-exchanger medium, such as water, an admixture of water and ethylene glycol, glycol per se, or a suitable alcohol or a hydroxyl derivative of hydrocarbons. The closed conduit system of the heat exchanger 40 includes a conduit 46 between the rear manifold 45 and second indoor coil means or indoor coil 47, another conduit 48 between the indoor coil 47 and second pump means or a pump 50, and a conduit 51 between the pump 50 and the forward manifold 44. The pump 50 is not, however, a pump in the sense of the pump 30, namely, a compressor, but is instead simply a high velocity pump 50 which creates high flow of the nonrefrigerant heat-exchange medium and thus moves a high volume thereof through the coil 41. Additionally, the pump 50 pumps the nonrefrigerant heat-exchange medium in the same direction irrespective of the mode of operation of the heat-exchanger system 50. A second outdoor fan means or fan 52 is associated with the indoor coil 47.

Heating means, generally designated by the reference numeral 60, includes a relatively elongated burner 61 having lateral burner fins 62, 63 along which is a series of openings (unnumbered) which emit flames F when fossil fuel, such as natural gas or propane, is emitted from the orifices of the burner 61. Gas is introduced into the burner 61 through a conduit 64 which includes a valve 65. The gas is ignited in a conventional manner by conventional gas igniter 66 having a probe 67 which includes a conventional gap (not shown) across which a spark is generated to ignite the gas and create the flames F in a selective manner to be described more fully hereinafter.

Figure 2:
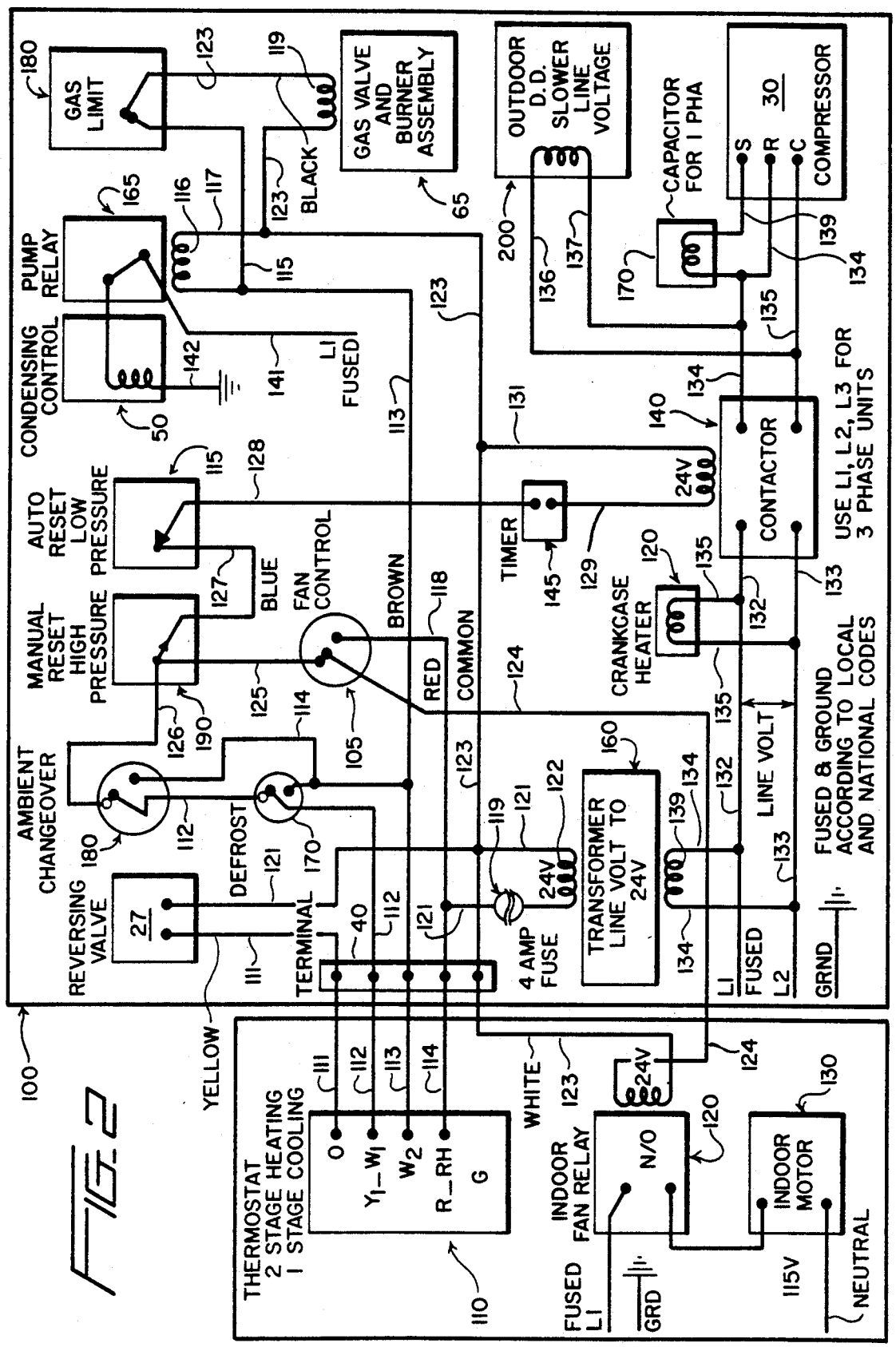
FIG. 2 is an electrical schematic illustration of the electrical control system of the invention, and illustrates components for selectively controlling the operation of the heat exchanger in its various modes of operation.

Reference is now made to the schematic electrical diagram of FIG. 2, and a control circuit 100 for controlling the various modes of operation of the heat exchanger 10.

A number 2 heating, 1 stage cooling thermostat 110 is located at an appropriate location within a building which is to be heated or cooled by the heat exchanger 10. The thermostat 110 should, of course, be preferably located such that it will be able to monitor a fair representation of the temperature conditions of the building to be serviced, in accordance with well understood prior art technique. A power terminal (0) of the thermostat 110 is connected through a conductor 111 to a coil (unnumbered) of the reversing valve 27 through a terminal board 40. The coil (not shown) of the reversing valve 27 is also connected via a conductor 121 to a conductor 118 which is in turn connected to one of the terminals (unnumbered) of the thermostat 110. The conductor 121 includes a secondary coil 122 of a 24 volt transformer 160. A primary 139 of the transformer 160 is connected by a line or conductor 134 to conductors 132, 133 which are in turn connected to a standard AC power source (line Voltage). The transformer 160 converts the AC power source into a 24 V power source for the thermostat 110.

A first output terminal (Y1-W1) of the thermostat 110 is connected through a conductor 11 to a first temperature sensitive defrost switch 170. A second output terminal W2 of the thermostat 110 is connected over a line 113 to both a pump relay 165 and over a line 115 to a gas limit switch 180. An R-RH terminal of the thermostat 110 is connected by the conductor 118 and the conductor 121 through a 4 ampere fuse 119 to the secondary 122 of the transformer 160. In this manner the thermostat 110 will provide 24 volts to one or both of the two output terminals (Y1-W1 and W2) in response to certain ambient temperature conditions, as will be described more fully hereinafter.

The first temperature sensitive defrost switch 170 referred to above has a corresponding normally-closed node (unnumbered) that connects to a temperature sensitive changeover switch 180 via the conductor 112. The normally-open node of the first temperature sensitive switch 170 connects to both the W2 output terminal of the thermostat 100 and to a node of the changeover switch 180 over a line or conductor 114 and the conductor 113. So configured, the first temperature sensitive switch 170 is positioned to sense temperature conditions proximal the outdoor coil 20, and in the presence of frost, will operate to prevent the thermostat 110 from enabling or energizing the pump 50 until or unless frost has been defrosted pursuant to an automatic response of the system, as will be described hereinafter.

The changeover switch 180 is further connected over a line or conductor 126 to a manual reset high pressure switch 190 which serves to protect the system's compressor 30 from damage through overheating; i.e., the changeover switch 180 is a temperature sensitive switch that is normally closed, but that opens in the presence of unacceptable heat. The temperature sensitivity of the changeover switch 180 serves other functions as well, as described appropriately hereinafter.

The manual reset high pressure switch 190 is coupled by a conductor 125 to a temperature sensitive fan control switch 105 and by a conductor 127 to an automatic reset low pressure switch 115. The former assists in controlling the indoor fans 38, 50 through an associated solenoid coil or relay 120 and the latter functions to shut down the compressor 30 in the event of low pressure due to a refrigerant leak or other similar problem. The fan control switch 105 is connected by the conductor or line 118 to the R-RH terminal of the thermostat 110. This connection is made via the normally-open node of the fan control switch 105. In addition to connecting to the changeover switch 180 via the manual reset high pressure switch 190, as noted above, the fan control switch 105 is also connected via a conductor or line 124 to the indoor fan relay 120 and an indoor motor 130 for driving the fans 38, 52 of the indoor coils 33, 47. The fan control switch 105 can provide the enabling 24 volts to the indoor fan relay 120 and the motor 130 when either the fan control switch 105 is closed (and power is available through the changeover switch 180), or when the fan control switch 105 is open (and power is available via the R-RH terminals of the thermostat 110). Also, the fan control switch 105 comprises a temperature sensitive device that is positioned to respond to the temperature of the glycol in the glycol system 40 such that the pump 50 will not be energized until the glycol reaches a predetermined temperature of 110° F. The fan 52 will also not be enabled through the indoor fan relay 120 until the 110° F. temperature is reached, and the latter is established by adjusting and/or setting the fan control switch 105 to the latter temperature.

The output of the normally-closed automatic reset low pressure switch 115 is connected over a line 128 to a timer 145 and over lines 129, 131 and a secondary to and for enabling a relay of a contactor 140. The timer 145 functions to delay delivery of an enabling signal from the automatic reset low pressure switch 115 to the contactor 140, which delay allows refrigerant pressure within the system 20 to balance prior to initiation of the compressor 30.

The contactor 140 comprises a make-or-break switch and functions, when enabled, to pass line voltage from the AC source to both the compressor 30 and an outdoor D.D. slower line voltage device 200. Line voltage is connected to the compressor 30 over lines 134, 135 connected to the R and C terminals of the compressor 30, respectively. The line 134 is also connected via a line 139 to a starting capacitor 270 of the compressor 30 which is also connected to a S terminal of the compressor 30. Lines 136, 137 are connected between the outdoor D.D. slower line voltage device 200 and the lines 134, 135.

So configured, the glycol system or subsystem 40 operates as follows: An appropriate 24 volt enabling signal from the Y1-W1 terminal of the thermostat 110 passes through the first temperature sensitive switch 170, the changeover switch 180, the manual reset high pressure switch 190, and the automatic reset low pressure switch 105 to the timer 145, presuming that the various conditions that the above switches are monitoring remain nominal (if one or more monitored conditions are indicative of a problem, then the 24 volt signal will be open-circuited). Following a predetermined period of delay, the timer 145 will pass the 24 volts to the contactor switch 140, thereby causing the contactor switch 140 to pass line voltage to the compressor 30. The compressor 30 will begin its operation while at the same time the 24 volt signal will also pass from the manual reset high pressure switch 190 through the fan control switch 105 (presuming appropriate temperature conditions, as explained below) to the indoor fan relay 120, motor 130 and fans 38, 52.

The system or circuit 100 will now be described relative to the operation of the glycol system 40 in the absence of the operation of the compressor 30.

The W2 terminal of the thermostat 110 is connected by the conductor 113 to a coil 116 of a pump relay 165 which, when energized, provides line voltage to the pump 50 over the lines 141, 142 connected respectively to line L1 and neutral/ground. When thus energized, the pump 50 will pump glycol through the system over the lines 46, 51 heretofore described relative to FIG. 1. The W2 terminal of the thermostat 110 also is connected to a gas limit switch 180 over lines 115, 123. A coil 119 in the line 123 operates the gas valve 65 and the igniter 66 in the absence of gas line malfunctions when the normally closed gas limit switch 180 is opened thereby causing the gas emitted from the burner orifice 62 of the burner 60 to ignite creating the flames F. Thus, both the glycol pump 50 and the burner 60 to create the flames F are activated.

Another operation of the system is also provided, recalling that both the changeover switch 180 and the first temperature sensitive defrost switch 170 are both coupled to the Y1-W1 terminal and the W2 terminal. Under certain temperature conditions, the W2 terminal can be low and the Y1-W1 terminal high. Ordinarily this means that the freon section or subsystem 20 will operate and the glycol section or subsection 40 of the system 10 will not. If external conditions are appropriate, however, (such as when there is frost on the exterior coil 11 or when the changeover switch 180 has been adjusted accordingly, as explained below), the corresponding switch (170 or 180) will open and prevent the freon system 20 from activating. At the same time, however, these same switches can provide the 24 volt signal from the Y1-W1 terminal to the enabling line 113 for the glycol pump 50.

The above response is appropriate when, for example, the outdoor or exterior coil 11 is covered with frost. By operating the glycol section 40 of the system 10 first, exhaust heat is created which will melt the frost upon the outdoor coil. When the coil temperature has risen sufficiently, the first temperature sensitive switch 170 will again close and the glycol system 40 will shut down (having served its purpose) and the freon section 20 of the system 10 will begin operating.

Many different system functions are facilitated through use of the changeover switch 180, and hence further description is now appropriate. The changeover switch 180, as alluded to above, essentially operates to respond to a need for heat (as sensed by the thermostat 110 by bringing either the freon section 20 or the glycol section 40 on-line, with both operating simultaneously, if desired) by asserting both the Y1-W1 terminal and the W2 terminal of the thermostat 110. To accomplish this the changeover switch 180 includes a breakpoint control that responds to outdoor temperatures. Typically, the switch 180 is, for example, a White Rogers No. 1687-8 switch-over temperature control switch located at an air intake area of the outdoor coil 11. The temperature of the changeover switch 180 can be selected such that one can choose the outdoor temperature at which the glycol section 40 of the system 10 will operate, but the freon section 20 of the system 10 will not. It is at this temperature that the switch 180 will open the compressor enabling line 134, 135 and couple instead the enabling signal to the glycol pump 50, burner 60, gas valve 65 and igniter 66 via the lines 113, 117, 115 and 123.

Preferably the thermostat 110 is adjusted such that terminal Y1-W1 will provide its enabling signal (typically to the freon based section 20 of the system 10 though, as noted above, not always) when the interior temperature is relatively close to the desired temperature (for example, $\frac{1}{4}°$ F.) Terminal W2 should therefore be adjusted to provide its enabling signal to the glycol based section 40 of the system 10 when a greater disparity exists between the desired temperature and the actual temperature (such as $\frac{1}{2}°$ F.). For example, presuming the above parameters to have been used, and the actual temperature drops to 69 $\frac{1}{2}°$ F., the Y1-W1 terminal will output the enabling 24 volt signal via the line 112, but the W2 terminal will not. So long as outdoor conditions remain appropriate (i.e., a frost condition does not prevail and/or the outside temperature is not below the breakpoint temperature for the changeover switch 180), only the freon based section 20 of the system 10 will operate. When extra heating is required (such as when a greater disparity exists between the desired temperature and the actual temperature), however, the W2 terminal can also provide a 24 volt enabling signal to the glycol based section 40 of the system 10, as described above.

Although a preferred embodiment of the invention has been specifically illustrated and described herein, it is to be understood that minor variations may be made without departing from the spirit and scope of the invention, as defined in the appended claims.

I claim:

1. A heat exchanger comprising first and second outdoor coil means located outdoors for circulating respective first and second different heat-exchange mediums therethrough, said first and second heat-exchange mediums being a refrigerant and a nonrefrigerant respectively, first and second indoor coil means located indoors for circulating therethrough the respective first and second heat-exchange mediums, first and second conduit means for placing said respective first and second outdoor coil means in fluid communication with the respective first and second indoor coil means, first and second pump means for selectively pumping the first and second heat-exchange mediums through the respective first and second conduit means, control means for selectively operating only one of said first and second pump means in a first mode of operation and for operating both said first and second pump means in a second mode of operation, flame generated heating means for heating the first and second outdoor coil means to thereby heat one or both of the circulating heat-exchange mediums depending upon the mode of operation of said control means during the circulation thereof through the associated first and second outdoor coil means by the operation of the associated first and second pump means, and said control means further being constructed and arranged for selectively operating said first and second pump means whenever said flame generated heating means is operative, and said second outdoor coil means being located between said first outdoor coil means and said flame generated heating means whereby heat unabsorbed by the nonrefrigerant circulating through said second outdoor coil means can be absorbed by the refrigerant circulating through said first outdoor coil means during the second mode of operation.

2. The heat exchanger as defined in claim 1 wherein the first heat-exchange medium is Freon.

3. The heat exchanger as defined in claim 1 wherein the second heat-exchange medium includes alcohol.

4. The heat exchanger as defined in claim 1 wherein the second heat-exchange medium includes glycol.

5. The heat exchanger as defined in claim 1 wherein said control means includes means for preventing the operation of said flame generated heating means in a third mode of operation during which said first pump means is operative and said second pump means is inoperative.

6. The heat exchanger as defined in claim 1 wherein said control means includes electrical circuit means for controlling the selective operation of said first and second pump means and said flame generated and said electrical circuit means includes temperature responsive switching circuit means for establishing a predetermined changeover temperature setting which when greater than outdoor ambient temperature operates one of said first and second pump means in said first mode of operation and maintains said flame generated heating means operative.

7. The heat exchanger as defined in claim 1 wherein said control means includes electrical circuit means for controlling the selective operation of said first and second pump means and said flame generated heating means, and said electrical circuit means includes temperature responsive switching circuit means for establishing a predetermined changeover temperature setting which when less than outdoor ambient temperature operates both of said first and second pump means in said second mode of operation and maintains said flame generated heating means operative.

8. The heat exchanger as defined in claim 6 wherein said second pump means is rendered operative by said temperature responsive switching circuit means in said first mode of operation.

9. The heat exchanger as defined in claim 6 wherein said electrical circuit means includes indoor thermostat means for sensing relative minor temperature deviations between a set indoor temperature and actual indoor temperature, and other circuit means responsive to the thermostat means sensing a minor temperature deviation below the set indoor temperature for operating only one of said first and second pump means and rendering said flame generated heating means inoperative.

10. The heat exchanger as defined in claim 6 wherein said electrical circuit means includes indoor thermostat means for sensing relative minor temperature deviations between a set indoor temperature and actual indoor temperature, other circuit means responsive to the thermostat means sensing a minor temperature deviation below the set indoor temperature for operating only one of said first and second pump means and rendering said flame generated heating means inoperative, and additional circuit means for rendering said flame generated means operative upon a relatively major temperature deviation between the set indoor temperature of said indoor thermostat means and the actual indoor temperature.

11. The heat exchanger as defined in claim 8 wherein said electrical circuit means includes indoor thermostat means for sensing relative minor temperature deviations between a set indoor temperature and actual indoor temperature, and other circuit means responsive to the thermostat means sensing a minor temperature deviation below the set indoor temperature for, operating said second pump means and rendering said flame generated heating means inoperative.

12. The heat exchanger as defined in claim 8 wherein said electrical circuit means includes indoor thermostat means for sensing relative minor temperature deviations between a set indoor temperature and actual indoor temperature, other circuit means responsive to the thermostat means sensing a minor temperature deviation below the set indoor temperature for operating said second pump means and rendering said flame generated heating means inoperative, and additional circuit means for rendering said flame generated heating means operative upon a relatively major temperature deviation between the set indoor temperature of said indoor thermostat means and the actual indoor temperature.

13. The heat exchanger as defined in claim 1 wherein said first pump means is a compressor, and means for reversing the direction of circulation of said refrigerant to effect a cooling mode of operation of said first indoor coil means.

14. The heat exchanger as defined in claim 5 wherein said first pump means is a compressor, and means for reversing the direction of circulation of said refrigerant to effect cooling in said third mode of operation.

15. A heat exchanger comprising first and second outdoor coil means located outdoors for circulating respective first and second different heat-exchange mediums therethrough, said first and second heat-exchange mediums being a refrigerant and a nonrefrigerant respectively, first and second indoor coil means located indoors for circulating therethrough the respective first and second heat-exchange mediums, outdoor and indoor fan means associated with the respective outdoor and indoor coil means for creating heat-exchange airflow relative thereto, first and second conduit means for placing said respective first and second outdoor coil means in fluid communication with the respective first and second indoor coil means, first and second pump means for selectively pumping the first and second heat-exchange mediums through the respective first and second conduit means, flame generated heating means for heating the first and second outdoor coil means to thereby heat one or both of the circulating heat-exchange mediums depending upon the mode of operation of said control means during the circulation thereof through the respective first and second outdoor coil means, control means for:
  (a) rendering said first pump means inoperative and said second pump means and said flame generated heating means operative during a first mode of operation;
  (b) rendering said first and second pump means and flame generated heating means operative in a second mode of operation; and
  (c) rendering said second pump means and flame generated heating means inoperative and said first pump means operative in a third mode of operation, and
said second outdoor coil means being located between said first outdoor coil means and said flame generated heating means whereby heat unabsorbed by the nonrefrigerant circulating through said second outdoor coil means can be absorbed by the refrigerant circulating through said first outdoor coil means during the second mode of operation.

16. The heat exchanger as defined in claim 15 wherein said control means includes electric circuit means operative during said first mode of operation, and said electric circuit means includes temperature responsive switching circuit means for establishing a predetermined changeover temperature setting which when greater than outdoor ambient temperature renders said first pump means inoperative and said second pump means and flame generated heating means operative.

17. The heat exchanger as defined in claim 15 wherein said control means includes electric circuit means operative during said second mode of operation, and said electrical circuit means includes temperature responsive switching circuit means for establishing a predetermined changeover temperature setting which when less than outdoor ambient temperature renders both of said first and second pump means and said flame generating heating means operative.

18. The heat exchanger as defined in claim 15 wherein said control means includes electric circuit means operative during said third mode of operation, said electric circuit means includes indoor thermostat means for sensing relatively minor temperature deviations between a set indoor temperature and actual indoor temperature, and other circuit means responsive to the thermostat means sensing a minor temperature deviation below the set indoor temperature for rendering the second pump means and flame generated heating means inoperative and the first pump means operative.

19. The heat exchanger as defined in claim 15 wherein said control means includes electric circuit means operative during said third mode of operation, said electric circuit means includes indoor thermostat means for sensing relatively minor temperature deviations between a set indoor temperature and actual indoor temperature, other circuit means responsive to the thermostat means sensing a minor temperature deviation below the set indoor temperature for rendering the second pump means and flame generated heating means inoperative and the first pump means operative, and additional circuit means operative during said third mode of operation for rendering said flame generated heating means operative upon a relatively major temperature deviation between the set indoor temperature of said indoor thermostat means and the actual indoor temperature.

20. The heat exchanger as defined in claim 16 wherein said control means includes electric circuit means operative during said second mode of operation, and said electrical circuit means includes temperature responsive switching circuit means for establishing a predetermined changeover temperature setting which when less than outdoor ambient temperature renders both of said first and second pump means and said flame generated heating means operative.

21. The heat exchanger as defined in claim 16 wherein said control means includes electric circuit means operative during said third mode of operation, said electric circuit means includes indoor thermostat means for sensing relatively minor temperature deviations between a set indoor temperature and actual indoor temperature, and other circuit means responsive to the thermostat means sensing a minor temperature deviation below the set indoor temperature for rendering the second pump means and flame generated heating means inoperative and the first pump means operative.

22. The heat exchanger as defined in claim 16 wherein said control means includes electric circuit means operative during said third mode of operation, said electric circuit means includes indoor thermostat means for sensing relatively minor temperature deviations between a set indoor temperature and actual indoor temperature, other circuit means responsive to the thermostat means sensing a minor temperature deviation below the set indoor temperature for rendering the second pump means and flame generating heating means inoperative and the first pump means operative, and additional circuit means operative during said third mode of operation for rendering said heating means operative upon a relatively major temperature deviation between the set indoor temperature of said indoor thermostat means and the actual indoor temperature.

23. The heat exchanger as defined in claim 17 wherein said control means includes electric circuit means operative during said third mode of operation, said electric circuit means includes indoor thermostat means for sensing relatively minor temperature deviations between a set indoor temperature and actual indoor temperature, and other circuit means responsive to the thermostat means sensing a minor temperature deviation below the set indoor temperature for rendering the second pump means and flame generating heating means inoperative and the first pump means operative.

24. The heat exchanger as defined in claim 17 wherein said control means includes electric circuit means operative during said third mode of operation, said electric circuit means includes indoor thermostat means for sensing relatively minor temperature deviations between a set indoor temperature and actual indoor temperature, other circuit means responsive to the thermostat means sensing a minor temperature deviation below the set indoor temperature for rendering the second pump means and flame generated heating means inoperative and the first pump means operative, and additional circuit means operative during said third mode of operation for rendering said heating means operative upon a relatively major temperature deviation between the set indoor temperature of said indoor thermostat means and the actual indoor temperature.

25. The heat exchanger as defined in claim 23 wherein said control means includes electric circuit means operative during said first mode of operation, and said electric circuit means includes temperature responsive switching circuit means for establishing a predetermined changeover temperature setting which when greater than outdoor ambient temperature renders said first pump means inoperative and said second pump means and flame generated heating means operative.

26. The heat exchanger as defined in claim 24 wherein said control means includes electric circuit means operative during said first mode of operation, and said electric circuit means includes temperature responsive switching circuit means for establishing a predetermined changeover temperature setting which when greater than outdoor ambient temperature renders said first pump means inoperative and said second pump means and flame generated heating means operative.

27. The heat exchanger as defined in claim 15 wherein said first pump means is a compressor, and means for reversing the direction of said control means to thereby effect cooling through said first indoor coil means.

* * * * *